March 30, 1937.   A. McFARLANE   2,075,739
BIRD NEST
Filed Aug. 27, 1935

Andrew McFarlane
INVENTOR
BY Victor J. Evans & Co.
ATTORNEY

Patented Mar. 30, 1937

2,075,739

UNITED STATES PATENT OFFICE 2,075,739

BIRD NEST

Andrew McFarlane, Maspeth, N. Y.

Application August 27, 1935, Serial No. 38,098

4 Claims. (Cl. 119—45)

This invention relates to bird nests and has for its general object the provision of a novel form of artificial bird nest of simple and practical construction more closely simulating the natural bird nest, and which is particularly adapted for use in the breeding of birds in cages.

Another object of my invention is to provide in conjunction with my improved bird nest an efficient supporting means for same whereby the nest may be readily attached for convenient access to the doors or side walls, to the bars of which the nest may be readily secured by a simple operation.

Another feature of my invention resides in providing a supporting means of the character indicated which by an easy adjustment may be converted for attachment to the wooden members of a cage wall or any other portion thereof into which hooks may be installed.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

Figure 1:
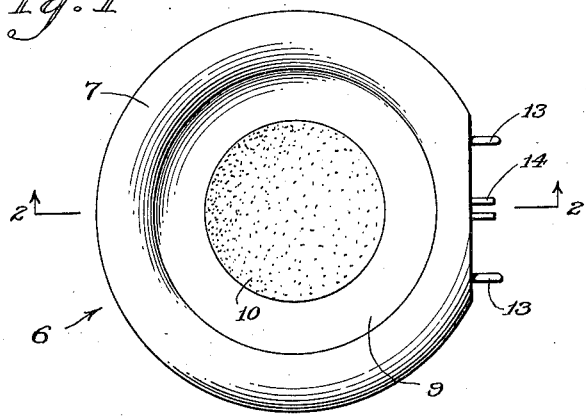
Fig. 1 is a plan view of my bird nest.

Referring now to the drawing for a more detailed description thereof, the numeral 6 indicates the body of my improved bird nest which is preferably cylindrical in general outline and constructed of an insect-repellent material such as cedar wood. At the upper edge or rim of the nest 6 is provided a round projecting bead 7 of substantial form so as to present a convenient perch or roost for the bird. At the lower corner of the nest 6 is formed a projecting bead 8 providing a broad base for the nest. The interior 9 of the nest 6 is dished preferably hemispherically so that the upper portion of same converges into the bead 7. The central area of the interior 9 is recessed to admit a circular disc 10 of cloth or of felt to provide additional warmth for the bird.

Figure 4:
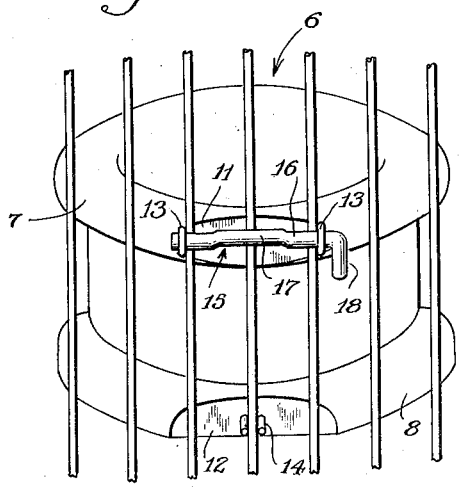
Fig. 4 is a perspective view illustrating the attachment of my bird nest to the bars of the cage.

Aligned portions of the perimeters of the beads 7 and 8 are cut away to form vertical flat surfaces 11 and 12 on the respective beads. Into the surface 11 is installed a pair of swivelled eyelets 13, such for example as screw eyes which may be readily screwed into the wood. The eyelets 13 are spaced equidistant from the vertical center of the surface 11 at a distance ample to permit the installation of same as shown in Fig. 4, so that each eyelet 13 is disposed just outside of a pair of vertical bars of the cage. Centrally disposed on the lower surface 12 so as to project perpendicularly from same are installed a pair of pins 14. The function of the pins 14, as shown in Fig. 4, is to engage with a cage bar between the bars engaged by the eyelets 13.

Figure 3:
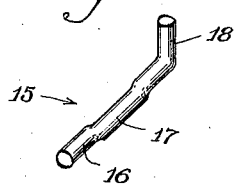
Fig. 3 is a perspective view of the attachment bar for the nest.
Figure 2:
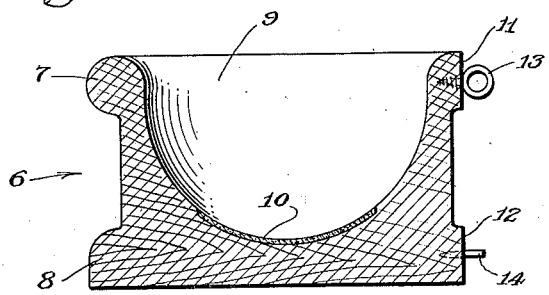
Fig. 2 is a central vertical section of same taken on line 2—2 of Fig. 1.

With my bird nest held in place against the vertical bars of the cage, as shown in Fig. 4, the same is secured in place by installation of the attachment bar 15, shown in Fig. 3, which comprises an elongate member 16 constructed preferably of round rod, an intermediate portion 17 of which is axially offset so as to form an eccentric. One end of the bar 16 is bent to the L-shape 18 to provide a convenient handle. To secure the bird nest 6 in place, as shown in Fig. 4, the bar 15 is inserted thru the eyelets 13 with the eccentric portion 17 away from the middle bar of the cage wall. The bar 15 is then turned on its axis by moving the L handle 18 so that the eccentric 17 is wedged against the central bar of the cage.

Figure 5:
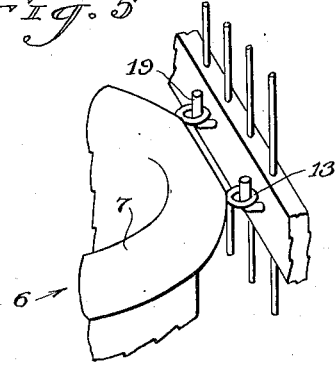
Fig. 5 is a fragmentary perspective view showing the attachment means converted for supporting the bird nest to a wooden member of the cage.

When it is desired to attach my bird nest to a wooden member of the cage wall the swivelled eyelets 13 are swung to horizontal position, as shown in Fig. 5. A pair of L hooks 19 are screwed into the wooden member of the cage, being spaced so that their projecting portions may be engaged into the eylets 13. In such installations the pins 14 may be engaged with an adjacent vertical bar of the cage wall so as to afford additional support for the nest 6.

What is claimed as new is:

1. A bird's nest comprising a body having a concave recess extending downwardly from its top, in combination with a cage having vertical bars, horizontally spaced eyelets projecting from said body and positioned adjacent bars of the cage, and a crank pin passing thru said eyelets and having an eccentric portion adapted to be turned into pressing relation to one of the bars of the cage to effectively hold the nest to the cage.

2. A bird's nest comprising a body having a concave recess extending downwardly from its top, in combination with a cage having vertical bars, horizontally spaced eyelets projecting from said body and positioned adjacent bars of the cage, a crank pin passing thru said eyelets and having an eccentric portion adapted to be turned into pressing relation to one of the bars of the cage to effectively hold the nest to the cage, and a pair of horizontally spaced pins extending from said body and adapted to receive a cage bar therebetween.

3. A bird's nest comprising a body having a concave recess extending downwardly from its top and having a circumferential groove intermediate the periphery of said nest forming a bead at its rim and a flange projecting from the bottom of said nest, said flange presenting a broad base for the nest to prevent tilting of same, in combination with a cage having vertical bars, horizontally spaced eyelets projecting from said nest body and positioned adjacent bars of the cage, and a pin passing thru said eyelets adapted to be disposed behind the cage bars to effectively hold the nest to the cage.

4. A bird's nest comprising a body having a concave recess extending downwardly from its top and having a circumferential groove intermediate the periphery of said nest forming a bead at its rim and a flange projecting from the bottom of said nest, said flange presenting a broad base for the nest to prevent tilting of same, in combination with a cage having vertical bars, horizontally spaced eyelets projecting from said nest body and positioned adjacent bars of the cage, a pin passing thru said eyelets adapted to be disposed behind the cage bars to effectively hold the nest to the cage, and a pair of horizontally spaced pins extending from said body and adapted to receive a cage bar therebetween.

ANDREW McFARLANE.